(12) United States Patent
Dehn

(10) Patent No.: US 9,516,914 B2
(45) Date of Patent: Dec. 13, 2016

(54) SELF-CLOSING VENTILATION INSERT AND METHOD FOR PRODUCING IT

(75) Inventor: Michael Christian Dehn, Hamburg (DE)

(73) Assignee: IQTEX Patentverwaltunq UG, Hamburg (DE)

(*) Notice: Subject to any disclaimer, the term of this patent is extended or adjusted under 35 U.S.C. 154(b) by 802 days.

(21) Appl. No.: 12/310,696

(22) PCT Filed: Sep. 6, 2007

(86) PCT No.: PCT/EP2007/007783
§ 371 (c)(1),
(2), (4) Date: Mar. 4, 2009

(87) PCT Pub. No.: WO2008/028659
PCT Pub. Date: Mar. 13, 2008

(65) Prior Publication Data
US 2009/0203275 A1    Aug. 13, 2009

(30) Foreign Application Priority Data
Sep. 6, 2006   (DE) .................. 10 2006 042 145

(51) Int. Cl.
*D03D 9/00* (2006.01)
*A43B 7/08* (2006.01)
(Continued)

(52) U.S. Cl.
CPC ............. *A43B 7/081* (2013.01); *B32B 3/12* (2013.01); *B32B 3/26* (2013.01); *Y10T 442/10* (2015.04)

(58) Field of Classification Search
CPC ............. B32B 3/12; B32B 3/20; B32B 5/16; B32B 5/30; B32B 27/14; B32B 2555/02; B32B 2250/05; B32B 2264/025; B32B 2305/026; B32B 2305/30; B32B 2307/26; B32B 2437/02; B32B 2437/00; B32B 2439/00; B32B 3/26; A43B 7/081; Y10T 442/10
(Continued)

(56) References Cited

U.S. PATENT DOCUMENTS 3,607,591 A    9/1971  Hansen
4,360,021 A *  11/1982 Stima ........................ 604/365
(Continued)

FOREIGN PATENT DOCUMENTS

CH       629 137      4/1982
DE      32 44 386     6/1984
(Continued)

OTHER PUBLICATIONS

Machine Translation, DE 19737434, Feb. 25, 1999, pp. 1-4.*
(Continued)

*Primary Examiner* — Elizabeth M Cole
(74) *Attorney, Agent, or Firm* — Nash and Titus, LLC

(57) ABSTRACT

The subject of the patent application is a self-closing ventilation insert for ventilating textiles, shoes or articles made up of at least two air-permeable layers, an absorber layer arranged between the air permeable layers, coverings above the air-permeable layers and at least one protective element. The absorber arranged in the chambers of the ventilation insert swells when it absorbs moisture and thereby closes the chambers of the ventilation insert to make them impermeable to water and air. When the ventilation insert is dried, the chambers open and become permeable to air again. Furthermore, a method of producing the ventilation insert by injection molding is described. The ventilation insert according to the invention may be used in a wide variety of areas, both in the clothing sector and in technical areas.

20 Claims, 5 Drawing Sheets

(51) Int. Cl.
*B32B 3/12* (2006.01)
*B32B 3/26* (2006.01)

(58) Field of Classification Search
USPC .................................................. 428/117, 913
See application file for complete search history.

(56) References Cited

U.S. PATENT DOCUMENTS

| | | | |
|---|---|---|---|
| 4,424,248 A | 1/1984 | Tesch | |
| 4,495,235 A | 1/1985 | Tesch | |
| 4,640,810 A | 2/1987 | Laursen | |
| 4,662,874 A | 5/1987 | Korpman | |
| 4,704,107 A * | 11/1987 | Coates | 604/357 |
| 4,994,053 A * | 2/1991 | Lang | 604/367 |
| 5,041,330 A | 8/1991 | Heerten | |
| 5,174,231 A | 12/1992 | White | |
| 5,246,770 A | 9/1993 | Bottiglione et al. | B23B 5/30 |
| 5,296,290 A | 3/1994 | Brassington | |
| 5,346,565 A | 9/1994 | White | |
| 5,346,566 A | 9/1994 | White | |
| 5,607,414 A * | 3/1997 | Richards et al. | 604/378 |
| 6,020,043 A * | 2/2000 | Schreck | 428/70 |
| 6,420,625 B1 | 7/2002 | Jones | |
| 6,767,850 B1 | 7/2004 | Tebbe | |
| 8,844,158 B2 | 9/2014 | Dehn | |
| 2004/0049942 A1 | 3/2004 | Chen | |
| 2005/0249917 A1 | 11/2005 | Trentacosta et al. | 428/137 |
| 2006/0021695 A1* | 2/2006 | Blessing et al. | 156/196 |
| 2006/0149197 A1 | 7/2006 | Niemeyer | |
| 2008/0249492 A1 | 10/2008 | Schmidt | |
| 2009/0203275 A1 | 8/2009 | Dehn | |

FOREIGN PATENT DOCUMENTS

| | | | |
|---|---|---|---|
| DE | 37 04 503 | 8/1988 | |
| DE | 4 120 010 A1 | 12/1992 | A43B 7/08 |
| DE | 196 18 858 | 11/1997 | |
| DE | 19737434 A1 * | 2/1999 | A43B 3/0084 |
| DE | 698 33 007 | 3/1999 | |
| DE | 20 2004 000307 | 5/2000 | |
| DE | 101 01 388 A1 | 7/2002 | A43B 17/10 |
| DE | 10 2006 042 145 | 10/2007 | |
| DE | 10 2007 016 959 | 10/2008 | |
| EP | 0 278 419 | 8/1988 | |
| EP | 0 491 454 | 6/1992 | |
| EP | 0 491 454 | 12/1992 | |
| EP | 0 694 264 A2 | 1/1996 | A43B 13/18 |
| EP | 1 054 095 | 11/2000 | |
| EP | 1 054 095 A2 | 11/2000 | A41D 31/00 |
| GB | 2 189 679 A | 11/1987 | A43B 7/06 |
| GB | 2 377 177 | 1/2003 | |
| WO | WO 91/01766 | 2/1991 | |
| WO | WO 96/06590 | 3/1996 | A61F 13/15 |
| WO | WO 00/04936 | 2/2000 | |
| WO | WO 2004/016425 | 8/2003 | |
| WO | WO-2005/095692 | 10/2005 | |

OTHER PUBLICATIONS

Diaplex:"What's So Intelligent" internet Article XP002409993, from internet: URL: http://web.archive.org/web/199991202002110/ http://www.diaplex.com/intelligent.html1 [Dec. 2, 1999.

Office Action dated Mar. 22, 2012, in U.S. Appl. No. 11/911,593 (US Published appln. US 2009/0297756).

Office Action dated Jul. 26, 2012, in U.S. Appl. No. 11/911,593 (US Published appln. US 2009/0297756).

Office Action dated Aug. 8, 2013, in U.S. Appl. No. 11/911,593 (US Published appln. US 2009/0297756).

Office Action dated Oct. 18, 2013, in U.S. Appl. No. 13/140,439 (US Published appln. US 2012/0036733).

Jockusch et al., "Photoinduced Surface Crosslinking of Superabsorbent Polymer Particles", J. Applied Polymer Science, vol. 111, 2163-2170 (2009); published online Nov. 10, 2008 in Wiley InterScience (www.interscience.wiley.com).

* cited by examiner

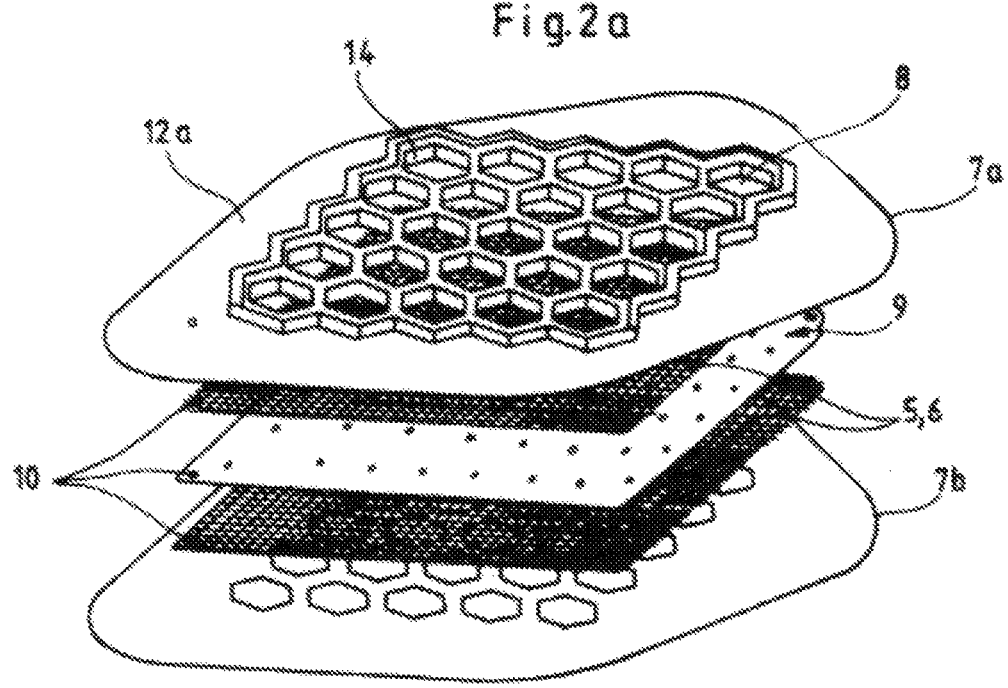
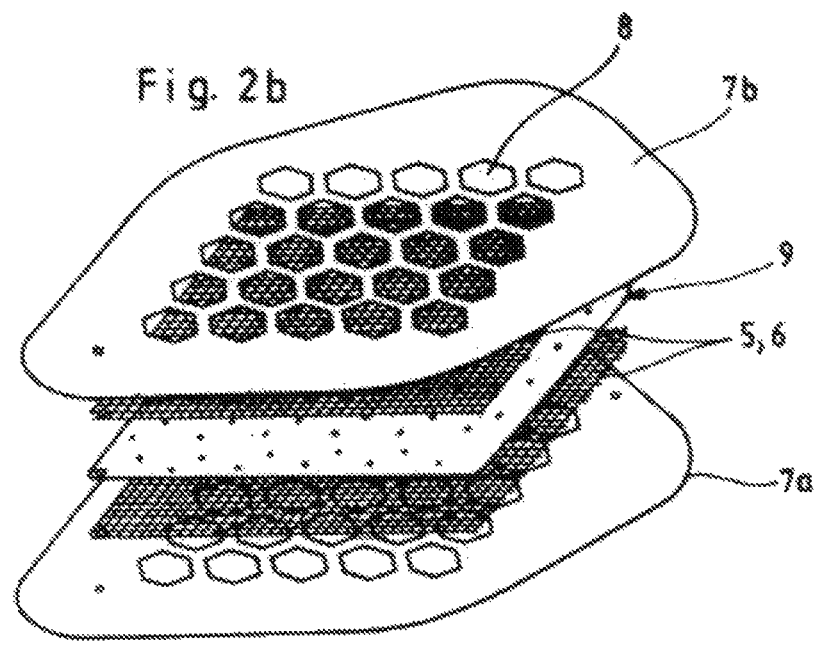

Fig. 4
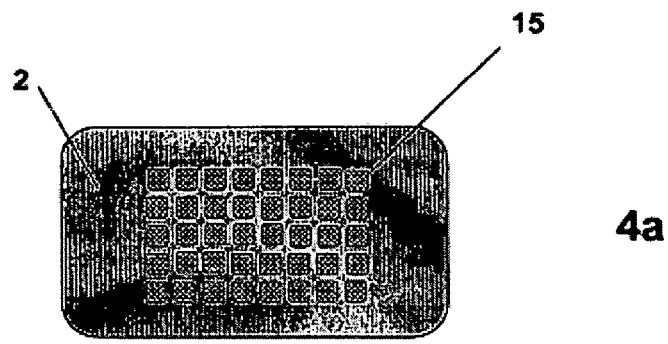
4a
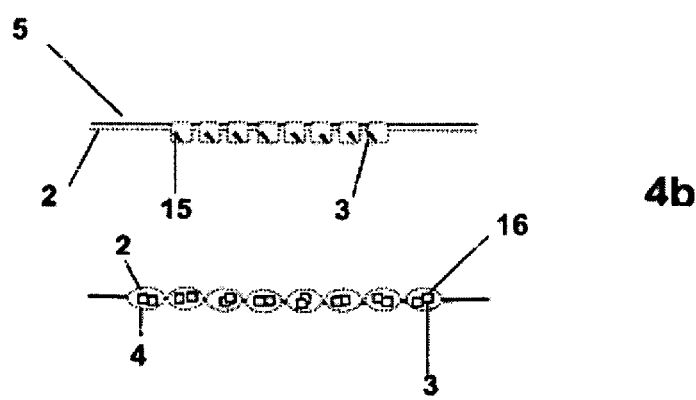
4b
Fig. 5
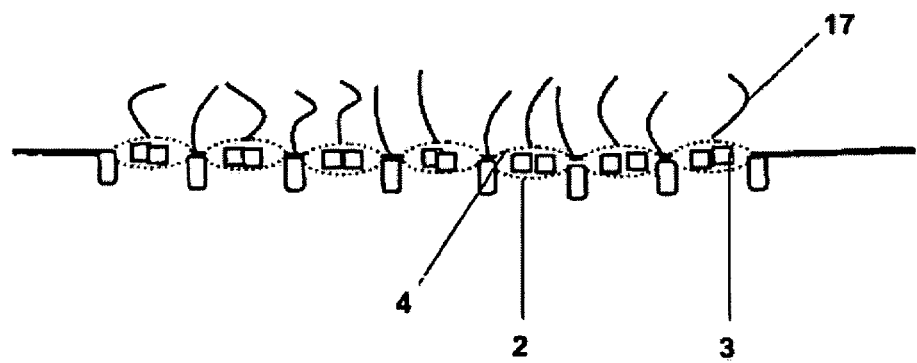

SELF-CLOSING VENTILATION INSERT AND METHOD FOR PRODUCING IT

This application is a 371 of PCT/EP2007/007783 filed Sep. 7, 2007.

FIELD OF THE INVENTION

The subject matter of the present invention is a self-closing ventilation insert for ventilation of textiles, shoes or articles comprising at least one first air-permeable layer, an absorber layer arranged on the first air-permeable layer, a second impermeable layer, coverings above the first and second air-permeable layers and at least one backing layer on one of the coverings. In addition, the subject matter of the present invention is a method for manufacturing a ventilation insert by injection molding.

BACKGROUND OF THE INVENTION

In many areas of daily life, ventilation of textiles or objects is desired to ensure adequate air circulation. Therefore, jackets or shoes are usually provided at least partially with substances which are air permeable so as to ensure a good exchange of air and moisture. If air circulation is not ensured, an accumulation of moisture often develops, in some cases even leading to the development of water of condensation. Therefore, various inserts have been developed to allow ventilation of objects made of textile materials, for example. The corresponding objects are often provided with openings which are covered with only an air-permeable fabric. The disadvantage of such openings is that they are not watertight and therefore water may be admitted from the outside. For clothing or shoes, coverings which are stretched mechanically over the ventilation opening are often provided.

In addition, various textile materials have been developed that make it possible to control the permeability of the textile material for water and moisture in a targeted manner. Water-vapor-permeable materials such as microfibers and/or membranes allow a low water vapor transport but do not allow circulation of air. A flat textile sheeting has been described accordingly in EP 1 054 095 A2, in which the material is stretched or shrunk as a function of temperature, thereby opening or closing the venting openings. However, this textile sheeting material can be used only in certain areas, where opening and closing are to be controlled by fluctuations in temperature.

US 2005/0249917 A1 discloses a membrane structure which allows targeted regulation of permeability as a function of ambient conditions. This membrane structure is used for protective clothing, for example, in which water vapor is to be transported out of the interior of the clothing, but hazardous liquids or gases should not penetrate into the interior. The membrane layer described here consists of two membranes whose positions relative to one another are shifted with a certain prompting. Accurate positioning of the membranes relative to one another in the manufacturing process is necessary for the functionality of the membrane system. Furthermore, a source of force, e.g., based on electric power, must be integrated into the membrane system, allowing displacement of the membranes relative to one another.

From the hygiene field, so-called superabsorbers capable of absorbing large quantities of water and swelling up in the process are known. The water uptake is reversible, so the water is released back into the environment when ambient humidity is lower. These absorber fleeces are used, for example, in diapers, items of feminine hygiene and in the construction industry. However, these absorber fleeces cannot be used for the clothing industry, for example, because they would not guarantee adequate comfort in wearing. A jacket provided with this absorber fleece would swell up greatly in the areas furnished with the absorber and would therefore increase in weight and would also release moisture to the underlying clothing, for example, by means of a resulting moisture bridge on coming in contact with other layers. Furthermore, the nonwoven materials are very sensitive to mechanical damage and even an impact against the location provided with absorber nonwoven could lead to damage and cause the absorber to swell out of the nonwoven. Furthermore, these substances are not waterproof because water not bound by the absorber seeps through between the absorber beads.

SUMMARY OF THE INVENTION

The object of the present invention is therefore to create a ventilation insert that closes automatically on coming in contact with liquids, in particular water, but ensures good ventilation in the dry state and can be closed without a mechanical covering and is adequately protected from mechanical damage. The ventilation insert should also be designed so that it can be used in a wide variety of areas, namely in clothing as well as in shoes or in coverings and also in protective clothing or articles for which circulation of air is desired with protection against moisture at the same time. In addition, the object of the invention is to provide a method which allows rapid and inexpensive production of the ventilation insert on an industrial scale.

This object is achieved according to the invention by a self-closing ventilation insert for ventilation of textiles, shoes or articles comprising at least one core element with a first air-permeable layer, an absorber arranged on the first air-permeable layer so that it swells up on coming in contact with liquid, in particular water, and a second air-permeable layer, coverings over the first and second air-permeable layers, a backing layer on the coverings such that the coverings and/or the backing layers compress the air-permeable layers and form a chamber structure such that the maximum expansion of the absorber is limited by the chambers, and due to this limitation, the absorber becomes compacted during the swelling process, thereby closing the ventilation insert. This closing is caused by a tactile fluid or water contact.

This object is also achieved by a method for manufacturing a ventilation insert for ventilation of textiles, shoes or articles, where the ventilation insert comprises at least one core element that contains an absorber, an upper covering, a lower covering, and a backing layer on the coverings, such that the method comprises at least the following steps:

A. arranging a core element layer on a covering layer and arranging a second covering layer on the core element layer, B. punching out or shape cutting the basic element using a punching tool, for example, or a laser from at least the core element layer, perforating and optionally pressing the basic element to create flow-through openings, and C. positioning the perforated basic element in an injection mold, preferably over the retaining device, D. injection molding of the backing layer such that the material of the backing layer is pressed through the flow-through openings of the basic element in an injection molding.

The subject matter of the invention is also a self-closing ventilation insert for ventilation of textiles, shoes or articles, comprising at least
an absorber layer having an absorber which swells on contact with liquid and
a backing layer,
characterized in that the backing layer
is at least partially air-permeable, e.g., is perforated and surrounds the absorber layer completely or
is air permeable and surrounds the absorber layer completely except for partial areas and
the backing layer limits the maximum expansion of the absorber so that a compaction of the absorber takes place during the swelling process due to this limitation, thereby closing the ventilation insert.
Additional embodiments are described below.

DESCRIPTION OF THE FIGURES

FIGS. 2a and 2b show exploded drawings of another embodiment of the inventive ventilation insert from the top side and the bottom side.

FIG. 4a shows a top view of another embodiment of the inventive ventilation insert.

FIG. 4b shows a sectional drawing through two different embodiments of the inventive ventilation insert.

FIG. 5 shows another embodiment of the inventive ventilation insert with transport elements.

DESCRIPTION OF THE PREFERRED EMBODIMENTS

Figure 1:
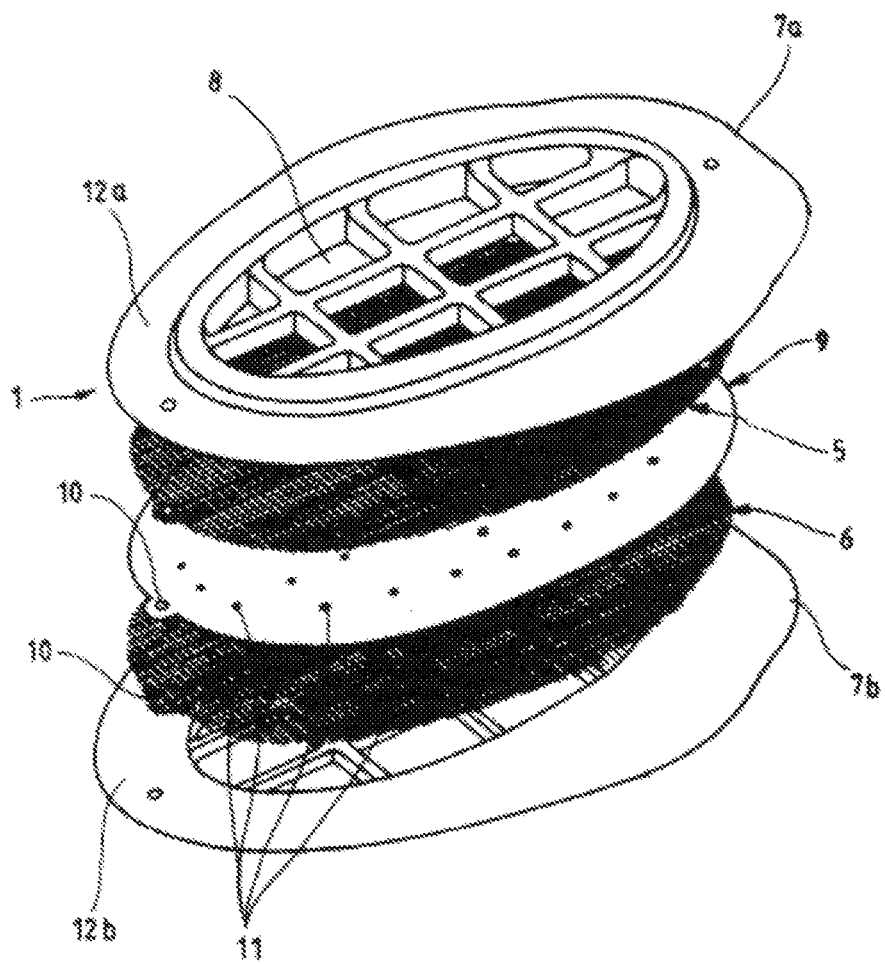
FIG. 1 shows an exploded drawing of an inventive ventilation insert.

The inventive ventilation insert is thus used in two basic forms. The one basic form, i.e., basic form 1, is an "individual element" having a chamber structure, such that the chambers limit the maximum expansion of the absorber. Such an embodiment is illustrated in FIGS. 1 to 3, for example. The other basic form, i.e., basic form 2, of the inventive ventilation insert is a flat sheeting or an integrated ventilation element, where the expansion of the absorber is limited by a backing layer.

In one embodiment, the core element of the air-permeable layers and the absorber layer and optionally the upper covering and the lower covering have retaining devices which allow positioning of the element in the injection mold. The retaining devices are boreholes, adhesive surfaces, structures or pins, for example, which support or allow positioning in the injection mold. Additionally or alternatively, the retaining devices are part of the corresponding injection mold.

The core element and optionally the coverings additionally preferably have flow-through openings through which the fluid material for the backing layer flows when the ventilation insert has been created. The flow-through openings may be, for example, holes in the layers which are preferably arranged regularly in the layer. When the fluid material, e.g., a plastic, flows through the flow-through openings during production, the top side and bottom side of the backing layer as well as optionally the protective grid and the connecting surfaces are formed at the same time. Furthermore, the top side and the bottom side of the backing layer are fixedly joined together by the material, which fills up the flow-through openings.

Depending on the height and diameter of the filled flow-through openings, the distance available in swelling of the absorber is defined and fixed. According to the invention, the fluid material is thus preferable for the production of the backing layer without flow-through openings is thus to be injected through the air-permeable layers, the absorber and optionally the coverings. Due to the use of flow-through openings, much higher-quality results and bondings are achieved. The flow-through openings may be used in a flexible number and with flexible shaping.

The partial areas of the backing layer which join the layers to one another are arranged as a single element in this embodiment, so that partial areas adjacent to the absorber are enclosed, e.g., in a ring shape or a honeycomb shape, so that the absorber is bound into a layer structure such that its expansion is limited in swelling. In addition, introduction into the layer structure has the advantage that the absorber is held in the proper position and cannot leak out of the ventilation insert. In any case, the fluid material of which the backing layer must consist, among other things, must be arranged in such a way that the partial areas adjacent to the absorber are exposed to ensure air permeability and water vapor permeability. This can also be restored by subsequent perforation of the layer.

In addition, the flow-through openings may also be used to attach plug connections, e.g., pins, which allow fixation of layers or components arranged one above the other, to retain the layers in a predetermined position or to control their expansion compression. However, this embodiment is less preferred.

The core element of the ventilation insert is especially preferably designed in one piece from air-permeable layers and absorber layers, especially preferably being designed as a fleece or nonwoven material finished with the absorber. In one embodiment, the core element and coverings are designed in one piece, especially preferably as a sandwich laminate.

For example, the air-permeable area on one side is coated with an absorber which forms the absorber layer, and the first air-permeable layer and the second air-permeable layer are formed by folding the air-permeable area, so that the two areas coated with absorber come to lie one above the other.

The following embodiments are possible for the two basic forms with regard to material and structure:

Absorber

The absorber is preferably a swellable polymer selected from the group of polyacrylic acid, polyacrylic acid copolymers and crosslinked sodium polyacrylate or casein, protein or a thermoplastic elastomer blend. The absorber is preferably mixed with a filler and the filler and absorber together form the absorber layer. For example, superabsorbers such as HySorb® from BASF AG or Favors® from Degussa AG may be used as the absorber.

If the absorber and/or absorber layer is designed jointly with the air-permeable layer or the backing layer as an absorber fleece, then the material used may be Luquafleece® from BASF, for example.

The choice of the absorber depends on which liquid is to cause swelling of the absorber. When used for swelling in water, the so-called superabsorbers are preferably used. In one embodiment, it is also possible to combine two or more absorber materials so that one absorber responds to water while another absorber material responds to a different liquid.

The absorber may also be replenished, e.g., high pressure injection, or an injection can be introduced between the backing layers subsequently.

Filler

Examples of fillers that may be used include polymer compounds, thermoplastic elastomer composites, animal fibers such as hair, down, leather, bone, horn, vegetable fibers, such as cotton, cellulose, cardboard, linen, coconut shells, wood, fibers, herbs, metallic, mineral fibers, carbon fiber knits, rubber and/or materials or blends thereof, powders or granules or materials with water-storing properties, e.g., microencapsulated waxes. The filler material serves to reduce the weight, for example. If a fluid-conducting or water-conducting filler material is used, it may also conduct the liquid absorbed previously and/or the water in the absorber outward by forming a targeted moisture bridge, thereby allowing faster evaporation of the water. The filler material and the amount of filler material are selected so that the swelling of the absorber and the resulting closure of the ventilation insert are not impaired. If the filler material serves to form a targeted moisture bridge, it is advantageously in contact with the object to be ventilated at the evaporation surfaces. Such evaporation surfaces may be, for example, the outer materials of a clothing item or a shoe. The use of such a filler material is advisable in particular when the outer material itself cannot form a moisture bridge to the interior material and therefore only a small evaporation surface is available. In this case, the side of the ventilation insert directed toward the user is advantageously designed so that it prevents more extensive conduction of moisture into the interior.

Backing Layer

The backing layer may consist of the following material or mixtures thereof, for example:

Polymer compounds, polymer foams, thermoplastic elastomer composites, substances with nanoparticle surfaces of animal materials, e.g., bones, horn, fibers, plant materials, e.g., coconut shells, wood, herbs, fibers, carbon composite materials, e.g., carbon, metal, mineral composite materials, ceramics, glass, rubber, resin, leather, cardboard and/or protein composites. The materials are either processed themselves by injection molding or are bonded to plastics, for example.

In one embodiment of the basic form 1, the covering is part of the backing layer and is also formed in production of the backing layer. The backing layer preferably forms a protective grid or a protective layer that protects the ventilation insert from damage, e.g., mechanical damage due to impacts. When the backing layer forms the covering at the same time, the covering has openings in partial areas, preferably formed by perforations. These openings may be produced, e.g., by punching, drilling, lasering, melting or cutting or they may already be formed by the use of corresponding tools during the injection molding operation. In a less preferred embodiment, the air-permeable layer is formed in one piece by the backing layer, such that corresponding air passage openings are formed by in-mold injection and the air permeability is ensured by the multiplicity of openings.

In another embodiment of the basic form 1, the inventive ventilation insert additionally has connecting surfaces which are preferably made of the same material as the backing layer or the coverings, especially preferably being embodied as an extension of the backing layer. The connecting surfaces serve to attach the ventilation insert to the object or material to be ventilated. The connection to the connecting surfaces may be accomplished by magnetic connection, clock connection, plug connection, sliding connection, inverting connection, adhesive connection, fold connection, thermoplastic welding or seams, for example. With the help of the connecting surfaces, the inventive ventilation insert is arranged over an opening in the textile or object to be ventilated in such a way that it completely covers this opening. In one embodiment the connecting surfaces are designed so that the inventive ventilation insert is replaceable. The ventilation insert may be constructed as a disposable item which is replaced after a single use. The ventilation insert is less preferably processed as an irreversibly sealing surface.

In one embodiment of the basic form 1, the connecting surfaces are embodied so that the ventilation insert can be replaced by a new ventilation insert. Such a replacement may also serve to use a ventilation insert having different properties, e.g., a ventilation insert having additional functions on the object to be ventilated. This embodiment is used in particular on safety helmets or electric items, for example.

In another embodiment of the basic form 1, the connecting surfaces are provided with structures or concave and/or convex bulges, which allow attachment of the ventilation insert to the object to be ventilated. The inventive ventilation inserts may be embodied in such a way that in addition to or instead of the connecting surfaces, they have connecting elements which allow attachment to the object. These connecting elements are, for example, additional components and the connection may be established by sheathing with plastic, gluing, screwing, riveting, plug connections or sewing. The connecting surfaces are produced in different thicknesses, depending on the area of application. The surfaces are preferably thin and taper to zero on the outside. The connecting surfaces may preferably already be extruded during production by injection molding or may be subsequently textured by mechanical roughening, etching, UV radiation or treatment with gases such as ozone. A suitably textured surface of the connecting surfaces facilitates attachment to the object to be ventilated when connecting means such as gluing or welding or the like are selected.

In another embodiment of the inventive ventilation insert, the object to be ventilated is designed so that the inventive insert is part of the object. The inventive ventilation insert is advantageously integrated into the object, e.g., in shoes, textiles or safety helmets, e.g., as an injection molded plastic part. For example, ventilation inserts may thus be vulcanized onto a shoe sole.

Depending on the arrangement, the connecting surfaces at the same time preferably serve as sealing surfaces and seal the opening of the object to be ventilated to prevent the penetration of air, dirt, dust, pollen and water.

The inventive ventilation insert may be attached to an object in such a way that the selected joining surfaces allow a subsequent rotation/alignment (plug connection/magnetic connection/displacement connection). This is advisable when a wearer of a suitably designed motorcycle helmet would like to adjust the ventilation area before starting to ride to control how much air, i.e., wind, is to enter the interior of the helmet or the protective suit or the interior of the protective boots.

An inventive design may have structures, e.g., baffles which have a positive influence on air flow/air induction into the object to be covered (safety helmet, motorcycle suit). Corresponding structures may be sensitive to wind strength, i.e., at a certain intensity of the wind, the object would become flexible due to the properties of the material and their design. The intensity and air flow can be controlled automatically in this way.

An additional layer and/or the backing layer and/or the protective grid may be constructed so that it is a movable component of the structure. This is advantageous when using safety helmets or safety goggles to regulate the ventilation effect, e.g., through alignment of the ventilation slots. The alignment may be accomplished by manual devices or by electronic controls or may depend on environmental influences such as the intensity of the wind due to driving.

The connecting surfaces of the inventive ventilation insert are structured in one embodiment in such a way that it is also possible for the end user to permanently connect a ventilation insert to a desired object, e.g., by patching together, e.g., through ironing surfaces, seams, adhesives, riveting.

Depending on the intended use, the inventive ventilation insert may be designed in both bask forms so that it additionally contains perfumes, coloring agents or active ingredients and/or filter materials which serve to improve the transport of air into the object. With use as a filter, for example, the inventive ventilation insert may be acted upon by activated carbon, silver and/or additional perfumes or active ingredients. The perfumes or active ingredients are optionally dispensed as a function of moisture.

In one embodiment, the scents, coloring agents or active ingredients are applied and/or introduced subsequently into the inventive ventilation insert by the user. For example, ventilation inserts in children's shoes may be provided subsequently with perfumes or dyes to allow the child to individualize his shoes. Suitable active ingredients include, for example, odor-binding substances, microbicidal substances or insect repellant substances. As one type of active ingredient, the ventilation insert may be provided with indicator substances, which indicate when the ventilation inert has come in contact with substances which limit or destroy is functionality. This indication may be achieved by a color change, for example. Substances which accelerate the drying of the absorber, e.g., materials that withdraw moisture from the absorber or generate electricity through kinetic energy or generate heat by a chemical reaction may be added as an active ingredient. It is also conceivable to design the ventilation insert to be heatable and to thereby achieve accelerated drying of the absorber.

The ventilation insert according to the invention preferably has structures/shapes that allow the waterproof connection with an object to be covered. This is especially important when the invention has been manufactured as a replaceable element. The ventilation insert may have a convex bulge, for example, designed as a peripheral edge inserted into a concave bulge, e.g., as a fitting counterpart to the peripheral edge which is provided in the object. The entire thing is then a plug connection that is replaceable and allows a watertight connection depending on the details.

In another embodiment, the air-permeable layers are directly joined to the absorber such that the connection is created, e.g., using a thermoplastic adhesive, a primer, plastic or an adhesive. In this embodiment, the material is made of air-permeable layers and the absorber preferably comprises yard goods, where the first and second air-permeable surfaces of the absorber layer arranged between the surface and optionally the coverings are joined to one another by means of retaining elements passing through the surfaces such that the retaining elements are preferably designed in the form of strips, dots, circles or lines.

For example, at least one of the coverings may be a direct component of a clothing item, e.g., a jacket, such as its outer material.

In another embodiment, the coverings consist of the material of the lining and/or the material of an outer material. The multilayer sheeting material created in this way is preferably manufactured as yard goods. In this embodiment, the clothing item to be ventilated advantageously consists partially or completely of this sheeting material.

The two backing layers are preferably designed in one piece and are preferably produced by the injection molding process. In another embodiment, the backing layer may also consist of several parts, e.g., strips arranged side-by-side and partially one above the other. In another less preferred embodiment, the backing layer is designed differently on the top side and the bottom side, e.g., the bottom side is designed in one piece as a perforated surface and the top side is designed from multiple parts such as strips.

If the backing layer is designed in one piece, then the connections between the top side of the backing layer and the bottom side of the backing layer and the air-permeable layers are preferably fixedly connected to the backing layer, so that the air-permeable layers are secured in their distance from one another. In this way, chambers of a defined size are formed, limiting the expansion of the absorber. At the same time, the coverings are preferably joined together fixedly by the backing layer, so that the absorber layer preferably has a smaller diameter than the chamber formed by the coverings.

The air-permeable and water-permeable material component of the inventive ventilation insert is optionally designed in such a way that it is elastically adapted to the dry absorber but the volume is limited in expansion of the absorber in such a way that the absorber is compacted to form a waterproof surface. The backing layers and the joining surfaces not only have the function of reducing expansion or suppressing it but may also have the function of a spacer area. This is important, e.g., with textiles, gloves or shoes for the purpose of preventing leakage of absorber through the air-permeable surfaces when it is under a heavy load. This object may also be achieved by fillers, especially when they have cavities, e.g., sleeves made of an air-permeable and water-permeable material, coverings which have structures facing the absorber or are designed so that an absorber contained in them is not compressed too much.

A load on the absorber is also prevented by covering elements, for example, when they are connected to a covering in such a way that pressing on the area filled with absorber is prevented. This function may also be assumed by the protective grid and/or the protective layers which protect the ventilation insert from mechanical damage and in particular protect it from compression.

In another embodiment, the inventive ventilation elements may be provided with an additional perforated covering which offers additional protection from mechanical influences. Especially for use in shoe soles of protective shoes, the perforation openings may also be arranged at an oblique angle to the underside of the shoe sole to thereby prevent the penetration of foreign bodies that stand at a right angle, e.g., nails. The coverings are preferably made of a material which offers effective protection from mechanical influences, e.g., Kevlar.

The coverings may be made of a wide variety of materials and may be manufactured as woven or nonwoven material. The coverings may be manufactured from one of the following materials, for example:

Polymer compounds, cardboard, leather, thermoplastic elastomer composites, Kevlar, ceramic, animal fibers, e.g., wool, hair, down, leather, bone, horn; plant fibers, e.g., cotton, cellulose, linen, coconut shells, wood, fiber, herbs, metallic fibers, mineral fibers, human hair, carbon fiber knits, rubber and/or materials or mixtures thereof.

The coverings are produced for example by injection molding, extrusion or calendering, as films or sheets, whereby the openings in the coverings may also be produced by punching, drilling, puncturing, lasering, melting, cutting or milling.

The coverings are especially preferably a fine mesh, e.g., a metallic mesh, a metal mesh or a nylon mesh.

In one embodiment the inventive ventilation insert is designed as a textile sheeting or as part of a textile sheeting. This textile sheeting may be either woven or nonwoven materials. Furthermore, sheeting which has air-permeable openings in at least some areas of the absorber and thus harm the air-permeable layer may be considered. These openings may be introduced into the surface subsequently. These textile sheetings are produced as a laminate or as a sheeting which has cavities that are filled subsequently. The cavities are filled at least with one absorber which is optionally bound to a backing material. The cavities are optionally filled with a filler material that also serves as a spacer or fills the additional spacers. The spacers are preferably beads that prevent the surfaces from being compressed too greatly.

The textile sheeting is preferably provided with structures, e.g., the protective grid or the backing layer. When using the textile sheeting, these structures may be arranged on the side facing the environment, which may be accomplished by bending, pressing, seaming or by other methods. These structures serve as evaporation surfaces on the one hand while on the other hand serving to direct the air stream in a targeted manner. If the structures are designed as protective grid or as protrusions, they serve as spacers, for example. If the textile sheeting is introduced between an outer material and optionally an inner lining or some other layer such as the interior cushioning of a motorcycle helmet or the lining of a jacket, then these structures form air cushions in which additional air circulation is made possible. Furthermore, an insulation layer which has a positive effect on the wearing climate is created by the resulting air cushion. The structures are optionally arranged only or additionally on the side facing the body and may also assume the stated functions and advantages. It is conceivable for the structures to be arranged on both the top and bottom sides of the sheeting.

If the inventive ventilation insert has plastic components, e.g., when the backing layer and/or the protective grid are made of plastic at least in part, these parts additionally serve as spacer areas and/or as evaporation surfaces, as described in the present embodiment.

The sheeting described here can be manufactured in the following manner, for example: the air-permeable surfaces are treated partially with an adhesive, leaving partial areas exposed, which later form the air-permeable cavities. Due to the treatment with the adhesive, the areas treated in this way become water impermeable. The air-permeable surfaces are provided with an additional adhesive which serves to attach the absorber. The adhesive may already contain the absorber to this end or may be mixed with it. Optionally spacers and/or filler materials may be applied to the second adhesive. Production of such a sheeting is possible by a printing method, for example. In this method the adhesive which serves to join two air-permeable layers and the adhesive for the absorber as well as the absorber itself are applied in a single operation.

The sheeting and/or the layer structure may be embodied in different designs.

The sheeting described here is optionally divided into air-permeable and nonpermeable partial areas already in the manufacturing process, whereby at least the air-permeable areas are provided with an absorber before being joined to form a laminate. At least one layer of a multilayer sheeting may be provided with at least an absorber, but in addition with a backing material and spacer in partial areas. Such layers may consist of microfibers or membrane materials which are waterproof over the entire area but are permeable to water vapor. Corresponding layers may also be joined together by joining options that face one another, such that partial areas adjacent to the absorber are left free. The layers are inseparably attached to one another by facing options of joining them by facing options. There may also be a joining option on only one of the surfaces. The partial areas of the laminate which are situated adjacent to the absorber (at least in its immediate proximity) may be rendered air permeable subsequently, e.g., by perforations.

If the joining possibilities are inside a laminate, this has the advantage that the inventive multilayer sheeting does not differ visually from other surfaces not according to the present invention. Self-closing inventive air-permeable partial areas can thus be combined with functionless areas in an unnoticeable manner.

In another embodiment, the air-permeable layers are joined together in such a way that they form connected hollow bodies, preferably having a round cross section. For example, the hollow bodies may be designed as tubes which have microopenings or are formed by cavities arranged in the air-permeable areas of a surface. If the hollow bodies are designed as tubes, then the absorber is in the core of the tube and the individual tube hollow bodies may be joined together by connections to form a sheeting which forms the core element of the inventive ventilation insert. Essentially the hollow bodies may be already filled with the absorber in production or may be filled subsequently, e.g., by injecting a gel which forms a powder or granules after drying. In the embodiment with cavities and/or hollow bodies, partial areas of the resulting sheeting are water permeable and are active in respiration, while the areas between the hollow bodies are preferably formed by water-impermeable surfaces which are optionally water-vapor-permeable. The water permeability and air permeability in the area of the areas filled with absorber may optionally by accomplished by a subsequent creation of openings such as perforations.

In another embodiment, the first air-permeable surface has a plurality of concave bulges which are filled with the absorber and optionally with filler material. The concave bulges are closed by the second air-permeable surface as a covering. The second air-permeable surface is preferably attached to the first air-permeable surface by thermoplastic welding or by adhesive. The area between the individual chambers is formed by the concave curvature so it is waterproof, whereby this property is achieved either through the choice of the corresponding material or through the type of connection of the air-permeable surface and/or the type of covering or backing layer. Ventilation surfaces are therefore preferably provided only within the concave curvature or at the level of the concave curvatures. The concave curvatures are produced by embossing and punching the material at the same time, for example, whereby water-permeable surfaces are optionally formed during this embossing process by providing the area of the concave curvatures with perforations, e.g., for the use of corresponding embossing tools. Alternatively, the previously water-permeable surface can also be sealed by the embossing, e.g., by pressure or heat or by applying additional materials. In addition, the water-permeability may also be achieved by applying another material, e.g., by sheathing with a water-impermeable plastic. This is preferably the plastic which forms the backing layer and which may also have the additional elements described above. The concave curvatures may assume different shapes, sizes and structures with regard to their inside surfaces as well as their outside surfaces. The concave curvature and its covering and/or the backing layer arranged over it may optionally also have structures or bulges. The absorber is preferably arranged on the side walls of the concave curvatures.

The coverings advantageously have material protrusions at the level of the concave curvatures, these protrusions extending into the concave curvature. The protrusions serve as spacers to prevent the chambers from being compressed too much and thus increase the mechanical stability of the chambers. When the material protrusions are arranged in such a way that they protrude into the absorber, they withdraw water from the absorber due to their capillary action and conduct it to the surface of the coverings, where it evaporates. The absorber therefore dries more rapidly and the layer structure becomes air permeable again more rapidly. The coverings are optionally designed to form convex bulges, which are preferably arranged above the concave bulges, so that convex and concave bulges together form spheres or the curvatures of the two surfaces intermesh. In another embodiment, a separate component arranged inside the concave curvatures also consists of an air-permeable layer and an absorber is arranged in its core. This separate component is preferably connected to the air-permeable surface and/or the covering of the inventive component in such a way that the air permeability is ensured only in the area of the separate components. The separate components are hollow bodies which are filled with the absorber. The swelling of the absorber is limited by the shape of the hollow bodies, preferably having a round cross section, and by the material and the volume of the cavity. In a preferred embodiment, the inventive ventilation insert has additional transport elements which are in contact with the air-permeable layer and/or the absorber layer and are preferably designed in the form of threads, strips or nubs. These transport elements form a moisture bridge and transport water through their capillary action out of the absorber to the surface and thereby increase the evaporative area. The absorber becomes dry again more rapidly and the inventive structure becomes air permeable again sooner. If the fibrous evaporative surfaces are arranged uniformly on the entire surface area of the inventive ventilation insert, namely both on the water-impermeable surface parts but also those containing the absorber, then the surface has a uniform stack length. After swelling of the absorber, the evaporative surfaces which are preferably situated in the areas of the absorber protrude beyond the other area, which allows both a visual effect as well as faster drying due to the protrusion of the transport elements.

In the embodiment of the inventive ventilation insert as a sheeting or an integrated ventilation element (basic form 2), it consists only of a backing material and an absorber layer, such that the absorber layer is surrounded completely on the outside by backing material that is designed to be partially perforated or air-permeable, or at least it surrounds the absorber in several directions in space. This ventilation insert is preferably embodied as a spacer knit provided with an absorber.

In both basic forms, the absorber may be embodied as sheeting goods, which will be cut to size, depending on the application. The edges, which are open after cutting and out of which absorber could escape, are sealed before use, e.g., by seams, by binding or applying a fluid material at the time of processing. Alternatively, the blanks cut to size may also be inserted, so that they fit accurately in the opening to be sealed. Swelling of the absorber in the edge areas is also prevented by the flush contact with the adjacent surfaces.

In the embodiment of the ventilation insert as sheeting (basic form 2), the absorber may be surrounded by spun or woven fabric or a nonwoven or an air-permeable layer. The absorber is arranged in the surface in lenticular, particulate or striated areas which include the absorber.

When the inventive ventilation insert is designed as an integrated ventilation element (basic form 2), the backing layer is preferably formed by a non-air-permeable material, which is partially perforated or is formed by components of the object to be ventilated itself. For example, for use in the sole of a shoe, the backing layer may be formed by the side walls of a ventilation duct which limits the absorber in its expansion in almost all directions in space. The inventive ventilation element functions similarly, for example, when it is introduced between two or more ribs or sheets in housing construction, for example, such that these ribs or sheets then form the backing layer. The inventive ventilation insert, when embodied as an integrated ventilation element, is preferably tubular or sleeve shaped and is optionally provided with a fibrous absorber.

The core element of the individual element and/or the sheeting is embodied in one embodiment in such a way that the absorber is bound in an adhesive and/or in a solution which can optionally be applied by a printing method. This allows printing of swellable surfaces that are covered and joined to a layer provided with perforations at the level of the absorber imprint, thereby forming the textile sheeting and/or the core element. In another variant, the air-permeable materials may be printed with an adhesive substance to which the absorber is applied in another step. Surfaces thereby provided with absorber are subsequently perforated at the level of the absorber placement. In all embodiments, the air-permeable layers may have bulges as an additional optional feature having a positive influence on air circulation.

Good air circulation within the object to be ventilated and in particular an exchange of air out of the interior of the object to be ventilated with the ambient air is surprisingly possible through the inventive ventilation inserts, whereby the ventilation insert becomes sealed automatically within an extremely short period of time on coming in contact with water. As soon as the water load subsides and the moisture evaporates, the ventilation insert opens again without requiring the user to open or close the ventilation openings through mechanical coverings. It has been found that another advantage of the inventive ventilation insert is that it is automatically self-repairing. Whereas other water-repellant and air-permeable membranes are damaged by drilling or puncturing, for example, this is not the case with the inventive ventilation inserts. For example, if a needle or a nail punctures through the layers of the insert and is removed again, the hole closes up again due to the swelling of the absorber and the user and/or the interior of the object is still effectively protected from wetness.

The inventive ventilation inserts are especially effective when the absorber has already been activated two to three times by wetness. It has been observed that the maximum air permeability and functionality are increased when the ventilation insert has been "preactivated" in its design as a reversible ventilation insert.

The ventilation inserts are also protected from mechanical damage due to the design with a backing layer and especially due to the design with the protective grid so it can also be used in a variety of ways in areas exposed to high stresses. The inventive ventilation insert advantageously increases in thickness only slightly with swelling of the absorber. In this way, the weight of the ventilation insert does not affect wearing comfort and faster drying is ensured due to the lower volume. The design of the inventive ventilation insert prevents uncontrolled swelling or "tearing apart" of the layers due to swelling of the absorber. Due to the absorber in the inventive ventilation insert, moisture is also transported outward from the interior of a clothing item, shoe or object. With a small amount of moisture, the absorber swells only slightly and conducts the moisture to the outside if the ambient air does not have a high atmospheric humidity. This also functions in the closed state of the ventilation insert because moisture evaporates at the surface, thereby drawing moisture out of the interior toward the outside. In the opened state of the ventilation insert as well as in the closed state, moisture is thus transported from the inside to the outside, so that the air quality in the interior of the object to be ventilated is improved.

The spacer area formed by the backing layers, for example, also prevents moisture from being released to areas where it is unwanted, e.g., the underlying clothing. Through targeted placement of the absorber in the chambers, it is also possible to prevent the absorber from absorbing too much moisture which is formed due to a negative effect on weight. In addition, the design of the inventive ventilation insert ensures that no absorber swells out of the ventilation insert. To this end, the ventilation insert has an air-permeable layer, which has such fine pores that the absorber cannot swell out even under pressure.

To prevent a moisture bridge from developing to the surrounding material and/or to the wearer of the corresponding articles, a non-water-conducting material is preferably used on the side facing the body or the material is finished accordingly. The formation of a moisture bridge is optionally made possible in addition by the plastic components such as the backing layers, the protective grid and spacer areas. Preventing direct physical contact with the corresponding surfaces has the advantage not only that an air layer is formed but also that cold and/or temperature differences are not relayed from the outside directly to the user through the moist material of the absorber or other components of the ventilation insert. The structures facing the body have the advantage that, first of all, an air stream can circulate on the body side and, secondly, with heavy sweating the tactile contact through water droplets, e.g., perspiration, does not cause the inventive ventilation insert to close prematurely due to swelling and thereby interrupt the ventilation. For the materials facing the body, for example, materials that are friendly to the skin but are not water conducting are used. Such materials include microfibers, for example, and/or membranes that have air-permeable openings in partial areas where the absorber is situated and thus form the air-permeable layers. Due to the use of such materials, the advantage of water vapor permeability of these materials can be associated with the improved air permeability of the inventive ventilation inserts.

The inventive ventilation insert, either as an individual element or as sheeting or as a ventilation element may be used in a wide variety of applications. A use of the inventive ventilation insert is preferably provided for ventilation of sleeping bags, tents, backpacks or bags, helmets, protectors, jackets, saddles, fermentation locks, protective suits, protective elements, motorcycle clothing, safety goggles or goggles, medical or orthopedic dressings, orthopedic or medical splints, prostheses, orthotics, shoes, gloves, textiles, coverings or covers. Furthermore, the inventive ventilation insert may be used in packagings, electronic equipment, dry silos, window frames, roof coverings or the components thereof.

If the inventive ventilation insert is used in shoes, then various positions in the shoe are conceivable. For example, the ventilation insert may be inserted into an insole with an integrated ventilation surface and may be positioned above the ventilation holes and/or optionally in the ventilation openings in the sole. The inventive ventilation insert then serves as a sealing device and prevents water from penetrating. The ventilation insert in the shoe sole made of plastic or leather or other conventional sole materials then functions like a cork. The inventive ventilation insert preferably has an additional covering element for this application above the backing layer, preventing the penetration of soil or preventing the loss of the absorber.

In all possible applications, the absorber is designed either as a separate component which is optionally replaceable or as a fixed component of the object to be ventilated. The absorber is not visible or is not visibly arranged in the object to be ventilated. For example, when using the absorber for ventilation of clothing or shoes, the inventive ventilation insert may be covered with an air-permeable material or a material having openings for visual reasons.

The inventive ventilation insert is designed to be light reflective in one embodiment. Furthermore, plastics/materials which light up in darkness (phosphorescing or fluorescing) or which light up by application of an electric voltage may be selected.

The inventive ventilation insert is preferably washable or can be cleaned by a chemical cleaning.

In the choice of materials for production of the inventive ventilation insert, these materials are preferably adapted to the intended purpose of the object. For example, materials which minimize the danger of injury such as especially stable meshes or multiple layers of air-permeable materials or stable protective grids or coverings are used for gloves, suiting, helmets and shoes. Nanomaterials having soil-repellant and water-repellant properties may also be used for parts of the inventive ventilation insert. This lengthens the respiration activity and delays the time of closing due to water or dirt. In one embodiment in which the inventive ventilation insert is used in a shoe, the ventilation insert is integrated into the shoe sole during the production of the shoe. A preferred component is one consisting of at least two absorbers, preferably three absorbers, which are joined together so that one ventilation insert is placed in the sole and the two others are arranged in a circle, for example, with the ventilation inserts to which they are attached both being arranged on the top side of the shoe.

The use of the inventive ventilation insert shall now be explained further on the basis of the following exemplary embodiments:

Some applications are explained in greater detail below as examples:

For use in a surface, the ventilation insert may be part of a shin guard or a safety helmet, for example.

The ventilation insert may be used for ventilation of protective military equipment such as protective clothing. For example, in protective suits for jet pilots, which are under excess pressure, the ventilation insert prevents the penetration of water if the pilot must be ejected from the aircraft, for example.

For use in medical technology, the ventilation insert may be placed in splints such as those used after a bone fracture and/or in protective coverings after injuries. Due to the improved air circulation, the healing process is accelerated and also ensures an increased wearing comfort. With this application, use in both veterinary medicine and in human medicine is possible. In this embodiment, the ventilation insert may also be provided with a dye which visualizes how long the splint must be worn. Furthermore, hydrochromic dyes may be used to indicate when the dressing or splint has come in contact with water and therefore must be replaced.

The ventilation insert may also be used in furniture surfaces, e.g., in the reclining surface or seat surfaces of child seats, baby carriers or child car seats. This allows ventilation while at the same time protecting from wetness and/or moisture. The inventive ventilation insert may be used in the construction industry, e.g., for ventilation of buildings, with windows that close well, or for heavy insulation.

Other possible uses of the inventive ventilation insert include coverings, plastic tarps and housings such as cable trees, fuse boxes, headlight lenses in which an accumulation of water of condensation can be prevented through the use of this ventilation insert. Preventing water of condensation is also conceivable when using the inventive ventilation insert in appliances, passenger vehicles, motorcycles, recreational vehicles, posterboard mounts, tents, sleeping bags, display cases or greenhouses.

The ventilation insert may also be used for ventilation of special containers that are used to store substances that are sensitive to moisture or liquid such as construction materials (cement, adhesives), animal feed, human food or medical products.

The ventilation insert may also contain active ingredients in addition to the absorber and may therefore also be designed as special filters, e.g., when used in a safety helmet, vacuum cleaner or dust mask. If the absorber is combined with activated carbon in the ventilation insert, then the activated carbon acts to prevent odors, while the ventilation insert at the same time prevents liquids from coming in contact with the electronics.

The ventilation insert may be arranged in a clothing item, in a surface or in an article so that it serves as a special valve and as an emergency water barrier layer or liquid barrier. The ventilation insert may be connected to electronic sensors which turn off the electronic item and/or trigger a certain control when the ventilation insert comes in contact with water or liquids.

The ventilation insert may be designed so that it functions as a current generator: in this embodiment, one covering layer is made of copper and the opposite covering layer is made of another material, e.g., zinc. When the absorber between the covering layers becomes wet, an electric current is generated and may be used like an LED or another electronic item or may trigger a circuit. For example, when used in children's clothing or children's shoes, this makes it possible for the latter to flash or emit tones when they become wet. The individual chambers of the ventilation insert may be connected one after the other as in batteries.

To present the inventive ventilation insert, it may be integrated into a test device. The test device consists of, for example, a hollow body that is open at one side and is inserted into the inventive ventilation insert. In the opened state, it is possible to blow air through the ventilation insert so that it functions like a whistle. When the ventilation insert is moistened, it closes, which has the effect in the test device that no more air can be blown through it.

In one exemplary embodiment, the inventive ventilation insert is formed by the material of the clothing item or shoe itself. For example, corresponding cavities and/or holes may be provided in the sole of a shoe, with absorber placed in the cavities or holes of the sole. This presupposes:

The use of a flat layer of an absorber.

Water vapor-permeable side walls.

Evaporative surfaces which are in contact with the absorber or its backing material. For example the backing material is moisture conducting and is optionally provided with an absorber only in partial areas. The evaporative surfaces may protrude into the interior of the shoe as well as protruding out of the shoe.

The inventive ventilation insert may also be designed as a sleeve element. In this case, a tubular backing layer surrounds the core material and/or the absorber. If the absorber swells up, then it closes the tubular element like a cork. The absorber may be in the form of an absorber fleece, for example, for use for the sleeve element or in the form of a fibrous backing that is coated with absorber.

In the other exemplary embodiment, the absorber serves to form a breathable insole. The insole has a hollow convex bulge provided with absorber, for example, on its underside. The material of the convex bulge is thus the backing layer of the inventive ventilation insert. The concave bulges have material passages which establish air connections between the interior of the shoe and the openings in the shoe sole. The shoe sole also has openings on its outside that are connected to the convex bulges. On coming in contact with water, the absorber present in the convex bulges compacts and closes the openings and the material passages in the convex bulges. The exemplary insole may also be designed so that it has no material passages when the convex bulges or openings in the shoe sole are arranged or formed so that air circulation through the openings in the shoe soles is possible when the absorber is not swollen. The convex bulges may also have air openings, e.g., in the form of a perpendicular sleeve element connected to the openings of the shoe sole. The convex bulges may also be designed in the form of a sleeve itself and may be arranged over the openings of the shoe sole and filled with absorber. On swelling of the absorber, the structures of the convex bulge then undergo deformation so that they are pressed together in a watertight manner.

Another exemplary embodiment comprises shoes or shoe soles having air guidance ducts. An absorber may also be arranged in the air guidance ducts, preventing admission of water. If the air guidance duct is connected to openings in the shoe sole, this also allows aeration but admission of water is prevented by the absorber so the absorber is preferably embodied as an integrated aeration element.

In the two examples for use in shoes as described above, incoming water is absorbed and the air guidance ducts are closed due to the swelling of the absorber before the water reaches the interior of the shoe and therefore the foot. At the same time, the wearing comfort of the shoe is improved because the absorber in the insole and/or in the air guidance duct withdraws atmospheric humidity from the interior of the shoe.

The insoles described as examples are either permanently glued into the shoe to prevent water from entering at the side edges and/or at the surfaces that are not sealed by the absorber or they have joining faces that do not form a seal.

The air guidance ducts described in the exemplary embodiments may also be used in others applications, e.g., in safety helmets or in electric appliances and may be closed by an inventive ventilation insert.

In one embodiment of the basic form 2, the inventive ventilation element is designed to be fibrous, i.e., an air-permeable layer is designed as a sleeve or tube, for example, and is filled with an absorber, optionally together with a backing material. The absorber with backing material may also be an absorber fleece, for example. If this inventive ventilation insert in fibrous form, where the fiber is understood to be the smallest form of area, is used, then it is sewn as fibers or introduced into openings. Air can circulate into the openings when dryness prevails accordingly. If the "fiber" swells in the presence of wetness, the openings are closed.

In another embodiment, the material of the absorber namely the filler material is magnetic and/or reactive to an energy field. This is achieved through appropriate materials and/or admixtures and compounds. In this way the alignment or the arrangement of the absorber and/or filler material can be influenced. If the filler material/absorber is in a perpendicular cavity, holes in a shoe sole, then these materials would be in a dry state on the underlying covering. Air circulation would be impeded by the "granules." If a portion of the side walls of the cavity is magnetic or, conversely, if the granules are magnetic, then these granular parts will collect on the side walls and air circulation through the cavity is enabled.

This effect can be created by a permanent energy field or may be accomplished in a targeted manner by applying/enabling a voltage. In addition, an energy field can be brought into the effective range, e.g., by a mechanical slide which is part of the object, e.g., the shoe. A magnet could be aligned, e.g., by an adjustable mechanism and/or shift device by the user as well as by an electronic device.

The materials and properties of the inventive ventilation insert are adapted to the use ranges and/or are selected accordingly. It is thus possible for example for the degree of crosslinking of an absorber such as that of a polyacrylic acid for the use area within clothing items to be different from that within work shoes where the wearer is exposed to a plurality of chemical substances and environmental influences. Furthermore, the material and/or materials may be adapted to the corresponding use areas and may be different in partial areas within a ventilation insert. As the ventilation insert for splints which are used for bone fractures and/or as protection in injuries (dressing, wound dressings), it is helpful if corresponding inserts for treatment of fractures have little or no flexibility and have materials and/or active ingredients that are friendly to the skin and/or skin climate on their underside facing the body. However, surfaces which are intended for use on safety helmets may also have other material properties different from those of surfaces whose fields of use include tents or clothing items.

If the inventive ventilation insert is used in an area where it is exposed to great mechanical stresses, e.g., a compressive stress, then the ventilation insert may additionally contain a protective grid to prevent compression of the areas containing the absorber and to ensure a pressure distribution which protects the surfaces containing the absorber. The ventilation insert is advantageously designed in areas with strong mechanical influences so that the areas containing the absorber are not under stress. This is possible for example by designing the backing layer between the areas containing the absorber to function as a hinge or to be elastic and flexible.

The inventive method is explained in greater detail below.

Before performing step B, preferably another method step A is performed as step

A arranging a core element layer on a covering layer and arranging a second covering layer on the core element layer.

In method step B, yard goods comprising air-permeable layers provided with absorbers are preferably used. These yard goods preferably have retaining devices which fixedly attach the individual layers to one another.

The forms punched out in step B have open sides. In one embodiment, the open sides of the basic element are closed by thermoplastic welding and gluing. In another embodiment, the open sides are closed by the backing layer or the connecting surfaces and/or by the plastic in injection molding. In another embodiment, the open sides of the basic element are sealed by thermoplastic welding or by ultrasonic welding in punching out according to step B, e.g., by a heated punch. When step B is performed by in-mold cutting using a laser, the edges are fused together and the basic element is again sealed in this way. It is less preferable to seal the open sides by an additional part, e.g., a frame or seams. Punching is performed, for example, using cutters or traditional punch tools.

At least the absorber layer and optionally the air-permeable layers and the coverings are preferably provided with flow-through openings and/or retaining devices in punching out in step B. The retaining devices are preferably used to position the basic element in the injection mold in step C. Objects having multiple parts are often produced. Different colors, degrees of hardness and optionally plastics or blends thereof can be injected on a single machine by the inventive method by using so-called gang molds. The air-permeable surfaces are preferably arched and the injection mold is shaped to the extent that these curvatures are also taken into account for the purpose of preventing compression of the surfaces. If the air-permeable surfaces are pressed together too tightly when the injection mold dies are brought together in the areas where the absorber is positioned, this would greatly reduce the subsequent air permeability.

Already in the punching operation according to step A, the absorber layer and optionally the air-permeable layers and optionally the covering are advantageously pressed in the partial areas, which are covered in injection molding, and the chambers are thus preformed.

In another embodiment, the coverings, the backing layer and optionally the protective grid are produced by injection molding and in another step E, the coverings are optionally perforated.

The joining faces are preferably produced and optionally textured during the injection molding step D.

Alternatively, the inventive ventilation insert is manufactured in such a way that all the components of the ventilation insert except for the absorber are manufactured in the manufacturing process of the object to be ventilated, e.g., by covering by injection of corresponding moldings or structures. The absorbers then introduced into the ventilation insert in a second method step, e.g., by injection or by high pressure. In addition it is also possible to sheath the moldings or structures by injection.

The invention is explained in greater detail on the basis of the following figures without being limited thereto.

FIG. 1 shows an embodiment of the inventive ventilation insert 1. One covering 5 is arranged above the core element 9 and another covering layer 6 is arranged beneath the core element. The core element 9, formed by a first air-permeable layer, an absorber layer and a second air-permeable layer, is designed here as an absorber fleece. The two coverings 5 and 6 as well as the core element 9 have flow-through openings 11 in the form of holes. The flow-through openings 11 are uniformly distributed over the entire surface of the coverings 5, 6 and the core element 9. During the injection molding operation, the fluid material flows through these flow-through openings and forms the backing layer 7. The backing layer 7 is shown here as the upper backing layer 7a and the lower backing layer 7b for better illustration, but this is a part which completely surrounds the core element and the coverings and additionally penetrates through them at the flow-through openings and joins them to one another. Chambers 8 which limit the expansion of the absorber are formed by the grid structure of the backing layer 7. The core element 9 and the coverings 5, 6 also have retaining devices 10, which serve to position the basic element of the covering and core element in the injection molding device. The backing layer 7 and/or 7b or optionally the covering is lengthened toward the outside by the joining surface 12a and/or 12b serving to attach the ventilation insert to the respective article.

FIG. 2a shows another embodiment of the inventive ventilation insert. The chambers 8 and the backing layer 7a and/or 7b are designed here in honeycomb form. The remaining structure of the core element 9 and coverings 5, 6 corresponds to the structure of the ventilation insert in FIG. 1. The top side of the backing layer 7a also has a protective grid 14 in the area of the chambers 8, rising above the surface of the backing layer 7a and forming part of this backing layer. The protective grid serves to secure the absorber core surrounded by the backing layer with respect to external stresses. Outside of the protective grid 14, the backing layer 7 is continued by the joining faces 12.

As shown in FIG. 2b, the bottom side of the ventilation insert has the identical chamber structure with chambers 8 on the backing layer 7b, but in this embodiment no protective grid is formed on the underside of the backing layer.

Figure 3A:
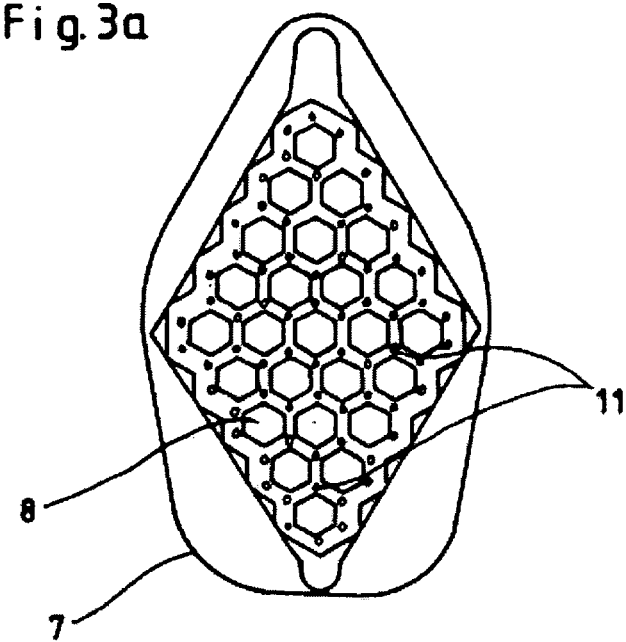
FIGS. 3a and 3b show a top view of two different embodiments of the inventive ventilation insert.
Figure 3B:
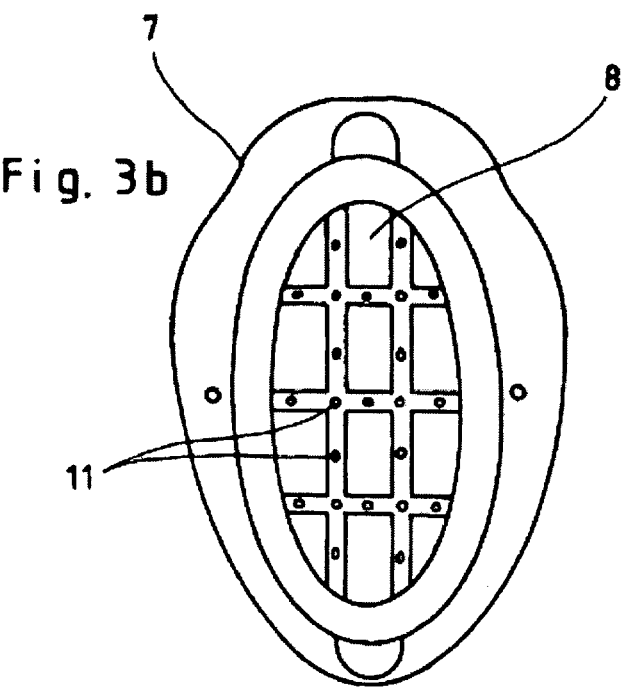

FIGS. 3a and 3b each show a view of an inventive ventilation insert where it can be seen that the chambers 8 are formed here by the material of the backing layer 7. Furthermore, the flow-through openings 11 through which the material of the backing layer flows are also discernible.

FIG. 4a shows the basic element of another embodiment of an inventive ventilation insert. As shown in FIG. 4a, concave bulges 15 are punched in the air-permeable layer 2. The concave bulges 15 serve to receive components that are filled with the absorber.

FIG. 4b shows two sections through corresponding ventilation elements. The absorber 3 can be seen in the concave bulges 15 which are formed in the air-permeable layer 2. The covering 5 is arranged above the components containing the absorber. FIG. 4b additionally shows a section through another embodiment in which the air-permeable layers 2 and 4 form hollow bodies 16. The absorber may be arranged directly in the hollow bodies 16 or as a component containing the absorber.

FIG. 5 shows a section through another embodiment of an inventive ventilation insert. The ventilation insert has transport elements 17 which protrude upward out of the ventilation insert. The transport elements are connected to the air-permeable layer 4 and/or the absorber 3 and serve to transport the moisture away and increase the evaporative surface area.

Figure 6:
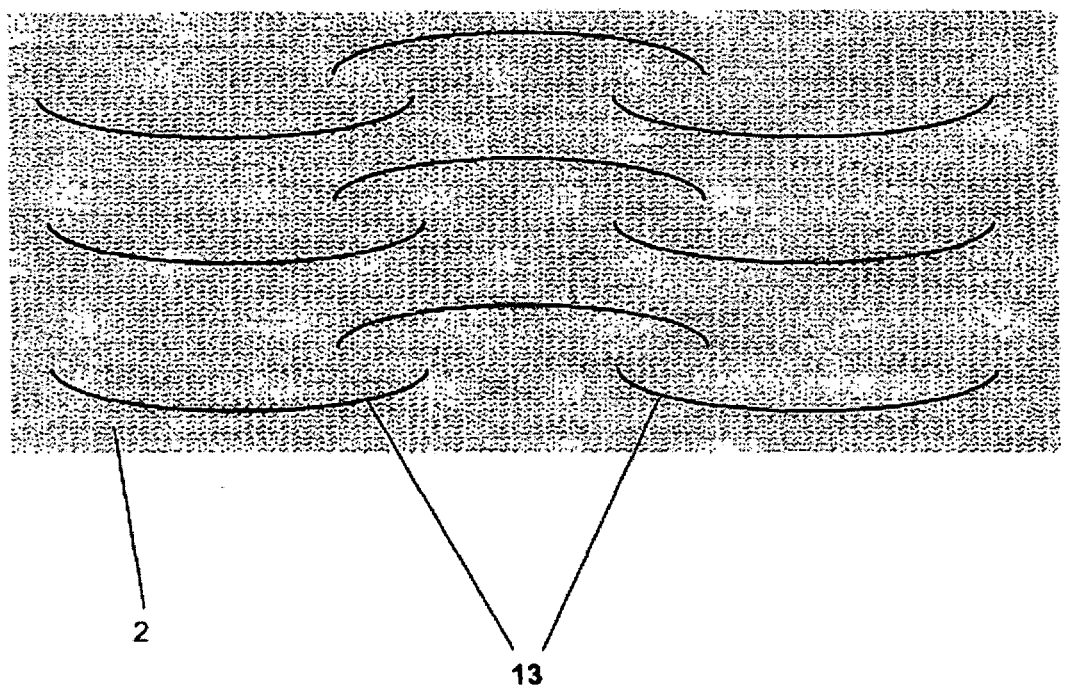
FIG. 6 shows a top view of a core layer with retaining devices.

FIG. 6 shows a view of a core element of air-permeable layers with absorber placed between them. The air-permeable layer 2 shown here is provided with strips of retaining devices 13 which join the two air-permeable layers fixedly to one another and to the absorber in between.

LIST OF REFERENCE NUMERALS

1 Ventilation insert
2 Air-permeable layer
3 Absorber
4 Air-permeable layer
5 Covering
6 Covering
7a, b Backing layer
8 Chamber
9 Core element
10 Retaining device
11 Flow-through opening
12 Joining surface
13 Retaining device
14 Protective grid
15 Concave bulges
16 Hollow body
17 Transport elements

The invention claimed is:

1. A shoe comprising a sole and a top portion and a self-closing ventilation insert, wherein the ventilation insert is arranged in or attached to the sole and/or the top portion, which ventilation insert comprises
a core element having
a first air-permeable and liquid permeable layer,
an absorber which is arranged on the first air-permeable layer and swells up and expands on contact with liquid,
a second air-permeable and liquid permeable layer, and
layers that are at least partially liquid permeable and at least partially air permeable, which layers comprise
a first covering above the first air-permeable layer,
a second covering above the second air-permeable layer,
a first backing layer on the first covering,
a second backing layer on the second covering,
characterized in that the first and second coverings and/or the first and second backing layers compress the air-permeable layers together in partial areas and form a chamber structure, such that the maximum expansion of the absorber upon contact with liquid is limited by the chamber structure and the absorber is compacted thereby as it swells up, wherein the swelling and compacting absorber fills the chamber thereby closing the ventilation insert.

2. The shoe according to claim 1, characterized in that the core element and optionally the coverings have retaining devices.

3. The shoe according to claim 1, characterized in that the core element of air-permeable layers, the absorber layer, and optionally the coverings have flow-through openings through which the fluid material for the backing layer flows in production of the ventilation insert.

4. The shoe according to claim 1, characterized in that the core element of the ventilation insert is formed in one piece from air-permeable layers and the absorber layer, and optionally the coverings, are designed in one piece.

5. The shoe according to claim 1, characterized in that the absorber includes a filler.

6. The shoe according to claim 1, characterized in that the first covering and the first backing layer are formed of the same material, and the second covering and the second backing layer are formed of the same material.

7. The shoe according to claim 1, characterized in that the ventilation insert further comprises joining faces that are constructed of the same material as the backing layer and/or the coverings, and are arranged as an extension of the backing layer.

8. The shoe according to claim 7, characterized in that the joining faces are magnetic.

9. The shoe according claim 1, characterized in that the backing layer forms a protective grid or a protective layer which protects the ventilation insert from damage.

10. The shoe according to claim 1, characterized in that the first and second air-permeable surfaces with the absorber layer arranged between the first and second coverings and joined together by retaining devices passing through the first and second coverings, and these retaining devices are embodied as strips, points, circles or lines.

11. The shoe according to claim 1, characterized in that the two backing layers are constructed in one piece.

12. The shoe according to claim 1, characterized in that the absorber layer has a smaller diameter than the chamber formed by the coverings and/or the quantity of dry absorber is selected so that the chamber is air permeable when the absorber is dry.

13. The shoe according to claim 1, characterized in that the air-permeable layers are joined together so that they form connected hollow bodies.

14. The shoe according to claim 1, characterized in that the first air-permeable surface has a plurality of concave bulges which are filled with the absorber and optionally with filler material.

15. The shoe according to claim 1, characterized in that the absorber is a swellable polymer selected from the group consisting of polyacrylic acid, polyacrylic acid copolymers and crosslinked sodium polyacrylate, casein, protein and thermoplastic elastomer composites.

16. The shoe according to claim 1, characterized in that the coverings are made of a fine metallic mesh.

17. The shoe according to claim 1, wherein the absorber is arranged in a separate component between the coverings.

18. The shoe according to claim 17, characterized in that individual chambers are formed by injection of plastic between the coverings.

19. The shoe according to claim 1, characterized in that the ventilation insert further comprises fluid transport elements which are in contact with the air-permeable layer and optionally with the absorber layer.

20. A shoe comprising a sole and a top portion and a self-closing ventilation insert, wherein the ventilation insert is arranged in or attached to the sole and/or the top portion, which ventilation insert comprises a core element having
    a first air-permeable and liquid permeable layer,
    an absorber which is arranged on the first air-permeable layer and swells up and expands on contact with liquid,
    a second air-permeable and liquid permeable layer, and
layers that are at least partially liquid permeable and at least partially air permeable, which layers comprise
    a first covering above the first air-permeable layer,
    a second covering above the second air-permeable layer,
    a first backing layer on the first covering,
    a second backing layer on the second covering,
wherein the first and second coverings and/or the first and second backing layers compress the air-permeable layers together in partial areas and form a chamber structure, such that the maximum expansion of the absorber upon contact with liquid is limited by the chamber structure and the absorber is compacted thereby as it swells up, wherein the swelling and compacting absorber fills the chamber thereby closing the ventilation insert,
wherein the core element of the ventilation insert is formed in one piece from the first and second air-permeable and liquid-permeable layers and the absorber layer, and optionally the first and second coverings, are designed in one piece,
wherein the at least one of the first or second backing layers forms a protective grid or a protective layer which protects the ventilation insert from damage,
and wherein the absorber layer has a smaller diameter than the chamber formed by the first and second coverings and/or the quantity of dry absorber is selected so that the chamber is air permeable when the absorber is dry.

* * * * *